(12) United States Patent
Jhung et al.

(10) Patent No.: US 7,235,508 B2
(45) Date of Patent: Jun. 26, 2007

(54) METAL-INCORPORATED NANOPOROUS NICKEL PHOSPHATE MOLECULAR SIEVE AND ITS PREPARATION METHOD

(75) Inventors: Sung Hwa Jhung, Daejeon (KR); Jong-San Chang, Daejeon (KR); Sang-Eon Park, Daejeon (KR); Anthony K. Cheetham, Santa Barbara, CA (US)

(73) Assignee: Korea Research Institute of Chemical Technology, Daejeon (KR)

( * ) Notice: Subject to any disclaimer, the term of this patent is extended or adjusted under 35 U.S.C. 154(b) by 111 days.

(21) Appl. No.: 10/916,512

(22) Filed: Aug. 12, 2004

(65) Prior Publication Data

US 2005/0043169 A1    Feb. 24, 2005

(30) Foreign Application Priority Data

Aug. 19, 2003   (KR) .................. 10-2003-0057350

(51) Int. Cl.
*B01J 29/04*   (2006.01)
*B01J 29/82*   (2006.01)

(52) U.S. Cl. .................. 502/74; 502/60; 502/73; 502/76; 502/208; 502/209; 502/210; 502/211; 502/212; 502/213; 502/214

(58) Field of Classification Search .............. 502/60, 502/73, 74, 76, 208, 209, 210, 211, 212, 213, 502/214
See application file for complete search history.

(56) References Cited

FOREIGN PATENT DOCUMENTS

EP        1 508 371    *    2/2005

OTHER PUBLICATIONS

Jhung et al., Template-Free Synthesis of the Nanoporous Nickel Phosphate VSB-5 under Microwave Irradiation, Chem. Mater., 16, 1394-1396, 2004.*
M. Hartmann et al., "Transition-Metal Ions in Aluminophosphate and Silicoaluminophosphate Molecular Sieves: Location, Interaction with Adsorbates and Catalytic Properties," *Chemical Reviews*, vol. 99, No. 3, pp. 635-663 (Mar. 1999).

* cited by examiner

*Primary Examiner*—Elizabeth D. Wood
(74) *Attorney, Agent, or Firm*—Finnegan, Henderson, Farabow, Garrett & Dunner, L.L.P.

(57) ABSTRACT

The present invention relates to a composition of metal-incorporated VSB-5 molecular sieve with nanopores and its preparation method, in particular, to a composition of a metal-incorporated VSB-5 molecular sieve with a framework of VSB-5 molecular sieve comprising nickel, phosphorous, oxygen and metal, which is useful in various fields such as a hydrogen storage material, an optical and electric/electronic material, a sensor, a catalyst, a catalyst supporter and an adsorbent, and its preparation method performed in such a manner that a specific metal component is added in a predetermined mole ratio to a reaction mixture comprised of nickel and phosphorous compounds and the resultant mixture is crystallized in the presence of inorganic or organic base as a pH modifier to yield a metal-incorporated VSB-5 molecular sieves in an economical and efficient manner.

11 Claims, 2 Drawing Sheets

METAL-INCORPORATED NANOPOROUS NICKEL PHOSPHATE MOLECULAR SIEVE AND ITS PREPARATION METHOD

BACKGROUND OF THE INVENTION

1. Field of the Invention

The present invention relates to a composition of a metal-incorporated VSB-5 molecular sieve with nanopores and its preparation method, in particular, to a composition of a metal-incorporated VSB-5 molecular sieve with a framework of VSB-5 molecular sieve comprising nickel, phosphorous, oxygen and metal, which is useful in various fields such as a hydrogen storage material, an optical and electric/electronic material, a sensor, a catalyst, a catalyst supporter and an adsorbent, and its preparation method performed in such a manner that a specific metal component is added in a predetermined mole ratio to a reaction mixture comprised of nickel and phosphorous compounds and the resultant mixture is crystallized in the presence of inorganic or organic base as a pH modifier to yield metal-incorporated VSB-5 molecular sieves in an economical and efficient manner.

2. Description of the Related Art

A nanoporous material of nickel and phosphorous, the so-called VSB-5 molecular sieve with pore openings composed of 24-membered ring of oxygen atoms has pores of about 6.4 Å, exhibits a catalytic activity for selective hydrogenation and dehydrogenation, and shows relatively higher thermal stability. Therefore, the VSB-5 molecular sieve has been highlighted as a porous solid inorganic material as compared to conventional zeolitic molecular sieves.

However, the procedure for synthesizing VSB-5 molecular sieve containing metal has not reported yet. Furthermore, the procedure for synthesizing VSB-5 molecular sieve not containing metal has not been well known. The only process reported so far for producing VSB-5 molecular sieve comprises the utilization of the diamine bases from 1,2-ethylene diamine to 1,8-octane diamine and nickel and phosphorous compounds (*J. Am. Chem. Soc.*, 125:1309-1312(2003); and *Angew. Chem. Int. Ed.*, 40:2831-2834(2001)). As the diamine base, 1,3-diaminopropane (DAP) is mainly used. The composition of VSB-5 molecular sieve includes as mole ratio of about 1.0 Ni: 2.1 P: 5.0 DAP: 140 $H_2O$, which undergoes a hydrothermal reaction for 5-6 days at 180° C. to yield VSB-5 molecular sieve. However, the diamines used as a base are generally expensive and require heat treatment for its removal after the synthesis of the VSB-5 molecular sieve. Furthermore, the heat treatment results in the destruction or occlusion of pore structures of the VSB-5 molecular sieve, which highly decreases the surface area of the VSB-5 molecular sieve thus reducing efficiency of its applications.

Meanwhile, the molecular sieve of metal aluminophosphate prepared by incorporating metal into the molecular sieve of aluminophosphate has been applied to various catalytic reactions and the properties of its metal have been very likely to be utilized (*Chemical review*, 99:635-663 (1999). In this regard, it could be recognized that the metal-incorporated VSB-5 molecular sieve shows improved applicability and usefulness. However, there has been no publication on the metal-incorporated VSB-5 molecular sieve.

Therefore, there remains a need in the art for developing a VSB-5 molecular sieve containing metal and a novel method for preparing a VSB-5 molecular sieve containing metal in an economical manner.

SUMMARY OF THE INVENTION

The present inventors have made intensive researches to develop a metal-incorporated VSB-5 molecular sieve, and as a result, found that a suitable amount of certain metal precursor is added to a composition of VSB 5 molecular sieve comprising nickel and phosphorous compounds as a raw precursors and a base as a pH modifier, in order to produce a metal-incorporated VSB-5 molecular sieve exhibiting redox, optical and electric/electronic properties which are not found in conventional VSB-5 molecular sieves. In addition the present inventors have found that a commercially-available low-cost inorganic base or organic base such as monoamine works as good as expensive diamines during crystallization for producing a VSB-5 molecular sieve. In particular, it has been surprisingly found that the inorganic base enables to avoid post-heat treatment, so that the process for producing a VSB-5 molecular sieve may be very cost-effective.

Accordingly, the object of this invention is to provide a metal-incorporated VSB-5 molecular sieve and a process for producing metal-incorporated VSB-5 molecular sieves in an economical and efficient manner.

DETAILED DESCRIPTION OF THIS INVENTION

Figure 1:
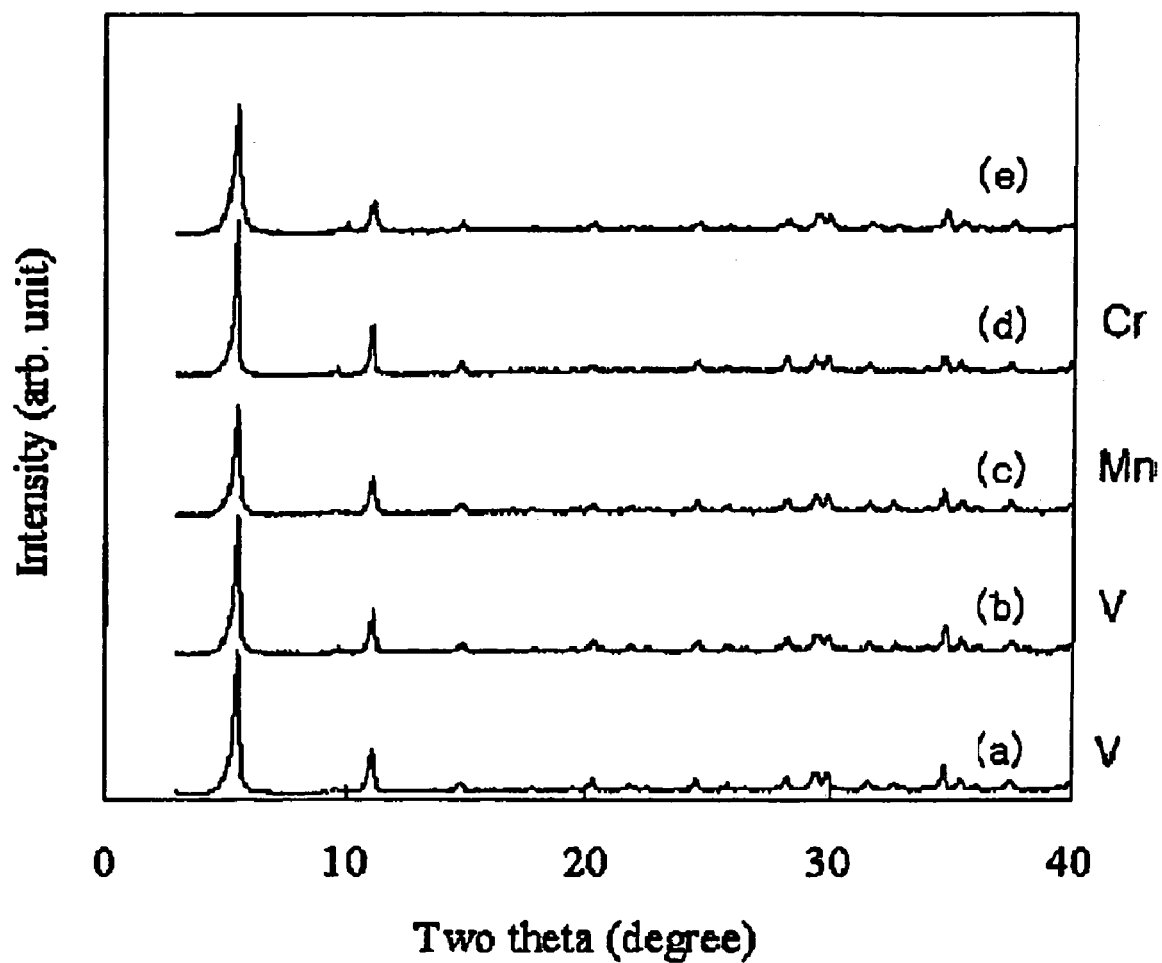
FIG. 1 represents the XRD spectrum of metal-incorporated VSB-5 molecular sieves produced from Examples 1-4 (a-d) and Comparative Example 1 (e).

In one aspect of this invention there is provided a composition of a metal-incorporated VSB-5 molecular sieve prepared using 1 mole of a nickel compound, 0.3-3.0 mole of a phosphorous compound, 0.001-1.0 mole of at least one metal component selected from the group consisting of a transition metal, a main-group metal, a noble metal of Group VIII and lanthanide, and 1.0-10.0 mole of a base.

In another aspect of his invention, there is provided a method for preparing a metal-incorporated VSB-5 molecular sieve, which comprises the steps of: (a) adding at least one metal selected from the group consisting of a transition metal, a main-group metal, a noble metal of Group VIII and lanthanide to a reaction mixture comprised of a nickel compound and a phosphorous compound; (b) adding an inorganic base or organic base to the resultant of (a); and (c) heating and crystallizing the resultant of (b) at a temperature of 50-350° C. and pH 7.0-12.0.

The present invention will be described in more detail as follows.

The present invention is directed to a composition of a metal-incorporated VSB-5 molecular sieve prepared by adding a specific metal to a reaction mixture comprised of nickel and phosphorous compounds followed by crystallization, and a method for preparing the metal-incorporated VSB-5 molecular sieve. The composition of the metal-incorporated VSB-5 molecular sieve of this invention shows redox, optical and electric/electronic properties, which are not found in conventional VSB-5 molecular sieves, so that it has an extremely wide range of applications. Further, the method of the present invention is economical and effective in the sense that it extends the range of a base useful to a low-cost inorganic base or monoamine to replace the very expensive diamine.

The composition of metal-incorporated VSB-5 molecular sieve of the present invention will be described in more detail as follows.

Examples of a nickel compound to be used as a raw material having a certain degree of solubility to a given solvent, for example, include an inorganic nickel compound such as nickel chloride hydrate and nickel nitrate hydrate, and an organic nickel compound such as nickel oleate and nickel oxalate. Of them, nickel chloride hexahydrate is most preferred. Another raw material, the phosphorous compound also exhibits the solubility to solvent to some extent, for example, including inorganic and organic phosphorous compounds such as phosphoric acid and tri-butylphosphate. Of phosphoric acid is most preferred.

As to the amount of the nickel and phosphorous compounds as raw materials, it is preferred that the phosphorous compound be used in the mole ratio of 0.3-3.0 to 1 mole of the nickel compound to maintain the mole ratio of (P/Ni) to 0.3-3.0. If the mole ratio is less than 0.3, the materials without pore structures may be obtained due to excess nickel; and if it is more than 3.0, the preparation of nanoporous materials becomes difficult because, under excess phosphorous, the material crystallizable may be dissolved to makes it difficult to obtain materials in solid-state.

The technical feature of this invention lies in the addition of a specific metal to a reaction mixture comprised of nickel and phosphorous compounds. The metals used are incorporated in the framework of VSB-5 molecular sieve and are positioned on the inner and outer surfaces of the molecular sieve, so that the molecular sieve exhibits the inherent characteristics of metal e.g., redox, ion-exchange, optical and electric/electronic properties. Therefore, the molecular sieve of this invention may be applied to a wider range of applications compared to a VSB-5 molecular sieve without incorporated metals.

The metal added to the reaction mixture containing nickel and phosphorous is at least one selected from the group consisting of a transition metal, a main-group metal, a noble metal of Group VIII and lanthanide. In particular, at least one selected from the group consisting of a transition metal such as titanium, vanadium, chromium, manganese and iron, a main-group metal such as silicon and magnesium, a noble metal such as palladium, and lanthanide such as lanthanum and cerium. The transition metal is more preferred. The metal-incorporated VSB-5 molecular sieves produced exhibit various characteristics depending on the type of metals incorporated. For example, the molecular sieves containing vanadium, chromium, manganese, palladium, lanthanum or cerium with redox properties show a catalytic activity in redox reactions; and those containing silicon or magnesium to show ion-exchange capacity are useful in ion exchange and removal of harmful ions.

It is preferred that the metal be used in the amount of 0.001-1.0 mole to 1 mole of nickel compound. If the amount is less than 0.001 mole, the function of the metal component becomes negligible; and if it exceeds 1.0 mole, the aggregation between metals occurs to occlude the pores of the molecular sieve, so that the inherent properties of a molecular sieve may not be expected. Examples of the metal that may be used as a metal precursor having a certain degree of solubility to a given solvent, for example, include at least one selected from nitrate, chloride, acetate, sulfate and oxide. More preferably, nitrate, chloride or acetate is used. The metal precursor may be dissolved in solvent or phosphoric acid. In addition, the metal precursor may be dissolved and added at the time of preparing the reaction mixture for VSB-5 molecular sieve containing base.

According to the present invention, at least one selected from low-cost inorganic base and organic base such as monoamine as a pH modifier may be used instead of high-cost diamines used in the conventional method to produce VSB-5. The inorganic base includes hydroxides or oxides of alkaline metal and alkaline earth metal, and ammonia. For example, sodium hydroxide, potassium hydroxide, calcium hydroxide, cesium hydroxide, ammonia, aqueous ammonia and the like may be used. The organic base includes a tertiary amine such as triethyl amine, tripropyl amine, diisopropylethyl amine and triethanol amine, a secondary amine such as dibutyl amine and dipropyl amine, a primary amine such as heptyl amine, octyl amine and nonyl amine and amine with ring structure such as morpholine, cyclohexyl amine and pyridine. More preferably, the inorganic base is employed because it does not require the heat treatment after synthesis. Most preferably, aqueous ammonia or sodium hydroxide is used.

The inorganic base and monoamine used in this invention serve as a pH modifier to maintain the raw material favorable to produce metal-incorporated VSB-5 molecular sieve. It is preferred that the inorganic base or monoamine be employed in the mole ratio of 1.0-10.0 to 1 mole of the nickel compound.

Meanwhile, another technical feature of this invention is a process for producing metal-incorporated VSB-5 molecular sieve performed in such a manner that a specific metal is added to a reaction mixture comprised of nickel and phosphorous compounds and crystallized in the presence of a base, wherein a low-cost inorganic base or organic base such as monoamine can be used as a base instead of the most frequently used expensive diamine.

The present process for preparing metal-incorporated VSB-5 molecular sieve as a porous solid inorganic material will be described in more detail hereunder.

First, nickel and phosphorous compounds, a metal compound, a base and a solvent are mixed in a predetermined mole ratio. The mole ratio is adjusted to obtain the composition of 1.0 Ni: (0.3-3.0) P: (0.001-1.0) metal: (1.0-10.0) base: (10-1000) solvent and pH of 7.0-12.0, more preferably, the composition of 1.0 Ni: (0.5-1.0) P: (0.005-0.5) metal: (2.0-8.0) base: (50-150) solvent and pH of 7.0-11.0. pH is adjusted by the addition of the base. If pH is beyond or below the above range, materials without micropores is obtained. The solvent is at least one selected from the group consisting of water, alcohols such as ethylene glycol, isopropanol and butanol, hydrocarbons such as benzene and n-hexane, carbon tetrachloride and chloroform. More preferably, the solvent is water or butanol, most preferably, water.

Thereafter, the mixture is heated at a high temperature to be crystallized. The crystallization is performed generally at 50-300° C., preferably, 100-250° C., and more preferably, 150-200° C. If the reaction temperature is lower than 50° C., the reaction proceeds extremely slowly to require a longer period of time for synthesis; but in the case of exceeding 300° C., the material containing nickel and phosphorous without pores is obtained. As a reactor for heating, a microwave or an electric heater is used. If the electric heater is used as a heat source, the reaction time ranges from several hours to several days; and if the microwave is used as a heat source, the reaction time ranges from several minutes to several hours.

During the crystallization, the agitation may be performed additionally. However, for the convenience of the process, agitation may be omitted. The agitation is usually performed at a rate of 100-1000 rpm, preferably, at 300-750 rpm. The present process may be carried out in a continuous or batch manner. If the process is performed for small-scale production, the batch reactor is appropriate; and if the process is performed for large-scale production, the continuous reactor is suitable. Where the evaporation of the solvent occurs significantly, the pressurized reactor is required to prevent the loss of the solvent.

Finally, the reaction resultant crystallized under the conditions described above is then cooled and subject to solid liquid separation to yield dried VSB-5 molecular sieve. The cooling is generally performed at 0 to 100° C. The separation of solid product from liquid may be carried out using a centrifuge or a vacuum filter.

If organic amine is used as a base, the heat treatment is performed under gas containing air and oxygen or vacuum to remove organic materials contained in pores, so that VSB-5 molecular sieve with high adsorption capacity may be produced. The heat treatment is preferably performed at 200-500° C., more preferably, at 300-450° C. If the temperature for heat treatment is lower than 200° C., the removal of organic materials is not sufficient to give VSB-5 molecular sieve with lower adsorption capacity; and if the temperature is higher than 500° C., the framework of VSB-5 molecular sieve produced is very likely to be destroyed. When the inorganic base is used, the heat treatment is not required. This is because the inorganic base is not strongly bound to a VSB-5 molecular sieve enough to remain in the VSB-5 molecular sieve produced and is well dissolved in water. Therefore, the inorganic base is easily removed from molecular sieve during washing step. In this regard, where the inorganic base is used, the production of pure VSB-5 molecular sieve may be accomplished by performing only washing and drying without the heat treatment required in the process using the organic amine.

The metal-incorporated VSB-5 molecular sieve produced according to this invention is nanoporous and very useful as a hydrogen storage material, an ion exchanger, an optical and electric/electronic material a sensor, a catalyst, a catalyst supporter and an adsorbent.

The following specific examples are intended to be illustrative of the invention and should not be construed as limiting the scope of the invention as defined by appended claims.

EXAMPLE 1

Nickel chloride hexahydrate ($NiCl_2 \cdot 6H_2O$) and vanadyl sulfate ($VOSO_4$) were dissolved in distilled water. To the mixed solution, was added 85% phosphoric acid dropwisely and then aqueous ammonia was added. The reaction proceeded under the conditions described in Table 1 to obtain the reactant composition of 1.0 Ni: 0.63 P: 0.017 V: 3.0 $NH_3$: $100H_2O$ (pH 7.7). 30 g of the reactant yielded thus were loaded into a Teflon reactor and the reactor was sealed and heated in a microwave oven for 4 hr at 180° C. to be crystallized. The reactor was cooled to room temperature (25° C.) and the solid liquid separation was performed to yield V-VSB-5 molecular sieve.

The BET surface area and the ratio of Me/(P+Ni+Me) of thus obtained V-VSB-5 molecular sieve, and the ratio of the unit cell volume to that of VSB-5 not containing metal are shown in Table 1 and its XRD spectrum is represented in FIG. 1.

Comparing the unit cell volume and the size of metal ion ($P^{5+}$: 0.35 Å, $V^{4+}$: 0.63 Å), it could be understood that vanadium ions are present in the molecular sieve.

EXAMPLE 2

The synthesis was carried out as Example 1 under the conditions described in Table 1, except that the amount of vanadyl sulfate was increased 4-fold in mole ratio.

The BET surface area and the ratio of Me/(P+Ni+Me) of thus obtained V-VSB-5 molecular sieve, and the ratio of the unit cell volume to that of VSB-5 not containing metal are indicated in Table 1 and its XRD spectrum is represented in FIG. 1.

Comparing the unit cell volume and the size of metal ion ($P^{5+}$: 0.35 Å, $V^{4+}$: 0.63 Å), it could be understood that vanadium ions are present in the molecular sieve.

EXAMPLE 3

The synthesis was carried out as Example 1 under the conditions indicated in Table 1, except that manganese acetate hexahydrate was used instead of vanadium to give Mn-VSB-5 molecular sieve.

The BET surface area and the ratio of Me/(P+Ni+Me) of thus obtained Mn-VSB-5 molecular sieve, and the ratio of the unit cell volume to that of VSB-5 not containing metal are indicated in Table 1 and its XRD spectrum is represented in FIG. 1.

Comparing the unit cell volume and the size of metal ion ($P^{5+}$: 0.35 Å, $Mn^{2+}$: 0.80 Å), it could be understood that manganese ions are present in the molecular sieve.

EXAMPLE 4

The synthesis was carried out as Example 1 under the conditions indicated in Table 1, except that 1,3-diaminopropane (DAP) was used as a base instead of aqueous ammonia, chromic acid ($CrO_3$) was used instead of vanadium and aqueous chronic acid solution was added to the mixed solution of nickel, phosphoric acid and DAP to yield Cr-VSB-5 molecular sieve.

The BET surface area and the ratio of Me/(P+Ni+Me) of thus obtained Cr-VSB-5 molecular sieve, and the ratio of the unit cell volume to that of VSB-5 not containing metal are indicated in Table 1 and its XRD spectrum is represented in FIG. 1.

Comparing the unit cell volume and the size of metal ion ($P^{5+}$: 0.35 Å, $Cr^{6+}$: 0.52 Å), it could be understood that chromium ions are present in the molecular sieve.

EXAMPLE 5

The synthesis was carried out as Example 1 under the conditions indicated in Table 1, except that 1,3-diaminopropane was used as a base instead of aqueous ammonia and vanadium pentoxide ($V_2O_5$) dissolved in phosphoric acid was used instead of vanadium sulfate to yield V-VSB-5 molecular sieve.

The BET surface area and the ratio of Me/(P+Ni+Me) of thus obtained V-VSB-5 molecular sieve, and the ratio of the unit cell volume to that of VSB-5 not containing metal are indicated in Table 1.

Comparing the unit cell volume and the size of metal ion ($P^{5+}$: 0.35 Å, $V^{4+}$: 0.63 Å), it could be understood that vanadium ions are present in the molecular sieve.

EXAMPLE 6

The synthesis was carried out as Example 1 under the conditions indicated in Table 1, except that silica sol ($SiO_2$) was used instead of vanadium and silica sol was added to the mixed solution of nickel compound, phosphoric acid and aqueous ammonia to yield Si-VSB-5 molecular sieve.

The BET surface area and the ratio of Me/(P+Ni+Me) of thus obtained Si-VSB-5 molecular sieve, and the ratio of the unit cell volume to that of VSB-5 not containing metal are indicated in Table 1.

Comparing the unit cell volume and the size of metal ion ($P^{5+}$: 0.35 Å, $Si^{4+}$: 0.42 Å), it could be understood that silicon ions are present in the molecular sieve.

EXAMPLE 7

The synthesis was carried out as Example 1 under the conditions indicated in Table 1, except that magnesium nitrate hexahydrate was used instead of vanadium sulfate to give Mg-VSB-5 molecular sieve.

The BET surface area and the ratio of Me/(P+Ni+Me) of thus obtained Mg-VSB-5 molecular sieve, and the ratio of the unit cell volume to that of VSB-5 not containing metal are indicated in Table 1.

Comparing the unit cell volume and the size of metal ions ($P^{5+}$: 0.35 Å, $Mn^{2+}$: 0.66 Å), it could be understood that magnesium ions are present in the molecular sieve.

EXAMPLE 8

The synthesis was carried out as Example 1 under the conditions indicated in Table 1, except that palladium chloride was used instead of vanadium sulfate and DAP was used instead of aqueous ammonia to give Pd-VSB-5 molecular sieve.

The BET surface area and the ratio of Me/(P+Ni+Me) of thus obtained Pd-VSB-5 molecular sieve, and the ratio of the unit cell volume to that of VSB-5 not containing metal are indicated in Table 1.

EXAMPLE 9

The synthesis was carried out as Example 1 under the conditions indicated in Table 1, except that palladium chloride was used instead of vanadium sulfate to yield Pd-VSB-5 molecular sieve.

The BET surface area and the ratio of Me/(P+Ni+Me) of thus obtained Pd-VSB-5 molecular sieve, and the ratio of the unit cell volume to that of VSB-5 not containing metal are indicated in Table 1.

Comparing the unit cell volume and the size of metal ions ($P^{5+}$: 0.35 Å, $Pd^{2+}$: 0.80 Å), it could be understood that palladium ions are present in the molecular sieve.

EXAMPLE 10

The synthesis was carried out as Example 1 under the conditions indicated in Table 1, except that lanthanum chloride hexahydrate was used instead of vanadium sulfate and lanthanum compound was added to the mixture of nickel, phosphorous compound and aqueous ammonia to give La-VSB-5 molecular sieve.

The BET surface area and the ratio of Me/(P+Ni+Me) of thus obtained La-VSB-5 molecular sieve, and the ratio of the unit cell volume to that of VSB-5 not containing metal are indicated in Table 1.

Comparing the unit cell volume and the size of metal ions ($P^{5+}$: 0.35 Å, $La^{3+}$: 1.06 Å), it could be understood that lanthanum ions are present in the molecular sieve.

EXAMPLE 11

The synthesis was carried out as Example 1 under the conditions indicated in Table 1, except that cerium nitrate hexahydrate was used instead of vanadium sulfate and cerium compound was added to the mixture of nickel, phosphorous compound and aqueous ammonia to produce Ce-VSB-5 molecular sieve.

The BET surface area and the ratio of Me/(P+Ni+Me) of thus obtained Ce-VSB-5 molecular sieve, and the ratio of the unit cell volume to that of VSB-5 not containing metal are indicated in Table 1.

Comparing the unit cell volume and the size of metal ions ($P^{5+}$: 0.35 Å, $Ce^{3+}$: 1.03 Å), it could be understood that cerium ions are present in the molecular sieve.

EXAMPLE 12

The synthesis was carried out as Example 1 under the conditions indicated in Table 1, except that DAP was used instead of aqueous ammonia and an electric heater instead of the microwave heater was used for the heat treatment for 4 days at 180° C. to give V-VSB-5 molecular sieve.

The BET surface area and the ratio of Me/(P+Ni+Me) of thus obtained V-VSB-5 molecular sieve, and the ratio of the unit cell volume to that of VSB-5 not containing metal are indicated in Table 1.

Comparing the unit cell volume and the size of metal ion ($P^{5+}$: 0.35 Å, $V^{4+}$: 0.63 Å), it could be understood that vanadium ions are present in the molecular sieve.

EXAMPLE 13

The synthesis was carried out as Example 1 under the conditions indicated in Table 1, except that an electric heater instead of the microwave heater was used for the heat treatment for 4 days at 180° C. and the agitation at 750 rpm was carried out.

The BET surface area and the ratio of Me/(P+Ni+Me) of thus obtained V-VSB-5 molecular sieve, and the ratio of the unit cell volume to that of VSB-5 not containing metal are indicated in Table 1.

Comparing the unit cell volume and the size of metal ion ($P^{5+}$: 0.35 Å, $V^{4+}$: 0.63 Å), it could be understood that vanadium ions are present in the molecular sieve.

COMPARATIVE EXAMPLE 1

The synthesis of VSB-5 molecular sieve was carried out as Example 1, not using metal.

The BET surface area of thus obtained VSB-5 molecular sieve is indicated in Table 1 and its XRD spectrum is represented in FIG. 1.

COMPARATIVE EXAMPLE 2

The synthesis of Co-VSB-5 was carried out as Example 4, except that cobalt acetate tetrahydrate was used instead of chromic acid. However, it was revealed from XRD spectrum that amorphous solid material was obtained instead of the target product of Co-VSB-5. In addition, the BET surface area of thus obtained material was measured to be less than 10 m²/g, indicating that the material yielded was without micropore structures.

TABLE 1A

| | | Reaction conditions | | | |
|---|---|---|---|---|---|
| Example | Metal | Composition (mole)* | pH | Temp. (° C.) | Time (h) |
| Exa. 1 | V | 1.0Ni:0.63P:0.017V: 3.0NH₃:100H₂O | 7.7 | 180 | 4 |
| Exa. 2 | V | 1.0Ni:0.63P:0.068V: 3.0NH₃:100H₂O | 7.8 | 180 | 4 |
| Exa. 3 | Mn | 1.0Ni:0.63P:0.033Mn: 3.0NH₃:100H₂O | 8.3 | 180 | 4 |
| Exa. 4 | Cr | 1.0Ni:0.63P:0.033Cr: 2.0DAP:100H₂O | 8.5 | 180 | 4 |
| Exa. 5 | V | 1.0Ni:0.63P:0.033V: 3.5DAP:100H₂O | 10.0 | 180 | 4 |
| Exa. 6 | Si | 1.0Ni:0.63P:0.033Si: 3.0NH₃:100H₂O | 8.3 | 180 | 4 |
| Exa. 7 | Mg | 1.0Ni:0.63P:0.033Mg: 3.0NH₃:100H₂O | 8.3 | 180 | 4 |
| Exa. 8 | Pd | 1.0Ni:2.4P:0.034Pd: 5.9DAP:13EG:88H₂O | 10.7 | 180 | 4 |
| Exa. 9 | Pd | 1.0Ni:0.63P:0.034Pd: 3.0NH₃:100H₂O | 8.0 | 180 | 4 |
| Exa. 10 | La | 1.0Ni:0.63P:0.033La: 3.0NH₃:100H₂O | 8.0 | 180 | 4 |
| Exa. 11 | Ce | 1.0Ni:0.63P:0.033Ce: 3.0NH₃:100H₂O | 8.1 | 180 | 4 |
| Exa. 12 | V | 1.0Ni:0.63P:0.033V: 3.0NH₃:100H₂O | 10.0 | 180 | 96 |
| Exa. 13 | V | 1.0Ni:0.63P:0.033V: 3.0NH₃:100H₂O | 8.0 | 180 | 96 |
| Com. Exa. 1 | — | 1.0Ni:0.63P: 3.0NH₃:100H₂O | 7.7 | 180 | 4 |
| Com. Exa. 2 | Co | 1.0Ni:0.63P:0.033Cr: 2.0DAP:100H₂O | 8.5 | 180 | 4 |

*1,3-diaminopropane; EG, ethylene glycol

TABLE 1B

| | | Reaction results | | |
|---|---|---|---|---|
| Example | pH | BET surface area (m²/g) | Composition (Me/(P + Ni + Me), atom %) | Unit cell volume (%)ᵉ |
| Exa. 1 | 8.4 | 436ᵈ | 0.58 | 100.25 |
| Exa. 2 | 8.2 | 334ᵈ | 1.91 | 100.63 |
| Exa. 3 | 8.6 | NDᵃ | 1.31 | 100.70 |
| Exa. 4 | 9.2 | 250ᶜ | 1.44 | 100.40 |
| Exa. 5 | 10.1 | NDᵃ | 1.19 | 100.46 |
| Exa. 6 | 8.7 | NDᵃ | 2.10 | 100.42 |
| Exa. 7 | 8.6 | NDᵃ | 0.50 | 100.40 |
| Exa. 8 | 10.9 | 300ᶜ | ND | 100.30 |
| Exa. 9 | 8.7 | 397ᵈ | 0.40 | 100.51 |
| Exa. 10 | 8.8 | 425ᵈ | 1.40 | 100.85 |
| Exa. 11 | 8.7 | 385ᵈ | 0.50 | 100.68 |
| Exa. 12 | 10.2 | 260ᶜ | 1.20 | 100.46 |
| Exa. 13 | 8.0 | NDᵃ | 1.10 | 100.40 |
| Com. Exa. 1 | 7.8 | 400ᵈ | 0.0 | 100.00 |
| Com. Exa. 2 | 9.7 | <10 | 1.50 | — |

NDᵃ, not determined;
ᶜBET surface area of an activated sample
ᵈBET surface area of an as-synthesized sample,
ᵉratio of the unit cell volume of a metal-incorporated VSB-5 to that of a metal-unincorporated VSB-5

Figure 2:
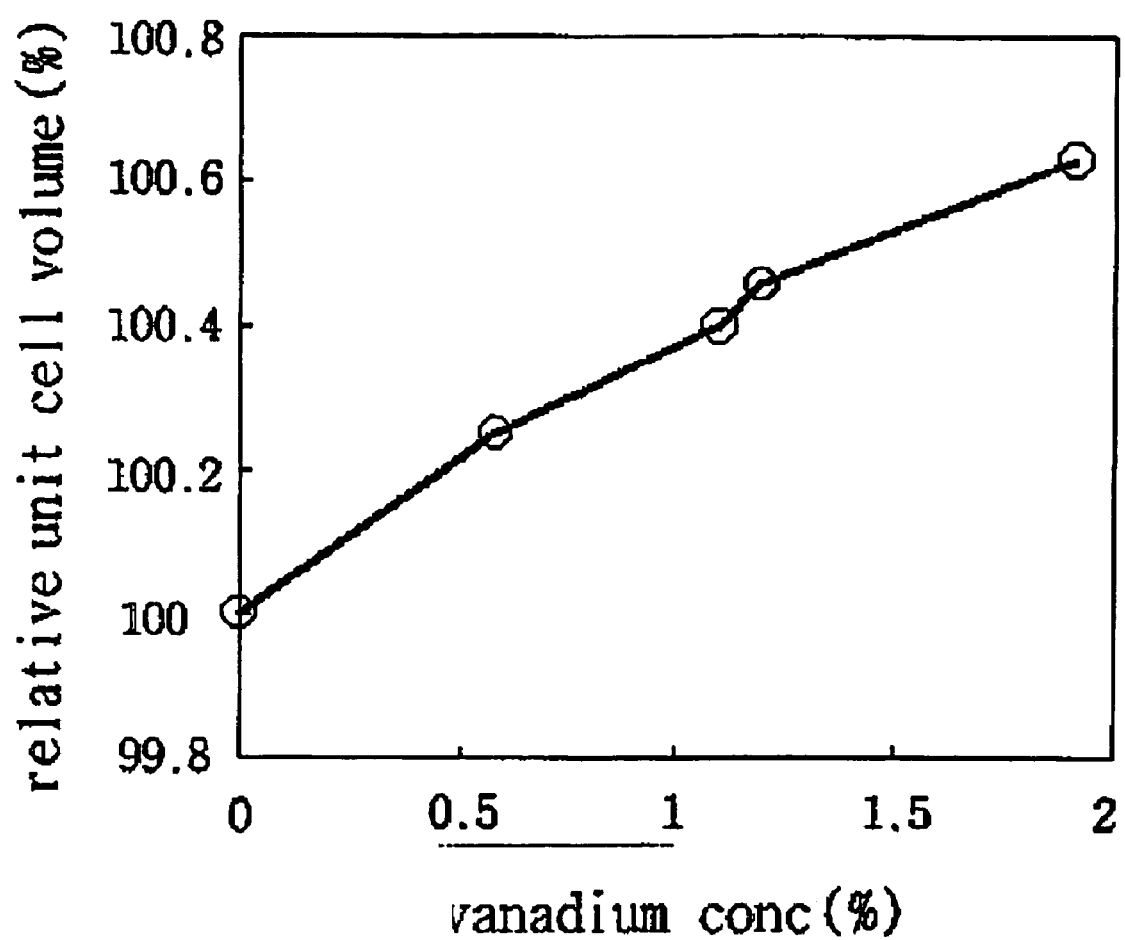
FIG. 2 shows the ratios of the unit cell volume depending on vanadium concentration of Examples 1, 2, 5, 12 and 13, and Comparative Example 1.

As indicated in Table 1, it could be appreciated that Examples 1-13 according to the present invention provided pure metal-incorporated VSB-5 molecular sieves, which is demonstrated with high BET surface area values and Me/(P+Ni+Me) and XRD spectrum of FIG. 1. Compared to BET surface area of the molecular sieve not containing metal, those of the molecular sieves from Examples 1-13 show comparable BET surface area. Referring to FIG. 2 representing the ratio of the unit cell volume depending on vanadium concentration, which are the results of Examples 1, 2, 5, 12 and 13, and Comparative Example 1, the unit cell volume shows a linear increase with the increase in vanadium concentration, which shows the successful production of vanadium-incorporated VSB-5 molecular sieve.

In addition, Examples using low-cost inorganic base or monoamine are more economic than Examples 4, 8 and 12 using conventional diamines; particularly, the cases using inorganic base can simplify the process for producing VSB-5 molecular sieve because they do not require heat treatment at high temperature. The molecular sieves produced show various properties depending on the type of metals incorporated. For example, the molecular sieves containing V, Cr, Mn, Pd, La or Ce show a catalytic activity in redox reactions; and those containing Si or Mg show ion-exchange capability and are therefore useful in ion exchange and removal of harmful ions.

As described above, the present invention using a suitable metal and a base renders the process to be simplified and also enables to provide a metal-incorporated VSB-5 molecular sieve in an economical and efficient manner. The metal-incorporated VSB-5 molecular sieve is very useful in various industrial fields such as a hydrogen storage material, optical and electric/electronic materials, a sensor, a catalyst, a catalyst supporter and an adsorbent.

What is claimed is:

1. A composition of a metal-incorporated VSB-5 molecular sieve comprising nickel (Ni), phosphorous (P), and at least one metal (Me) selected from the group consisting of a transition metal, a main-group metal, a noble metal of Group VIII and lanthanide; wherein the molar ratio of (Me)/(Ni+P+Me) is 0.4 to 5.9%.

2. The composition according to claim 1, wherein said metal is at least one selected from the group consisting of titanium, vanadium, chromium, manganese, iron, silicon, magnesium, palladium, lanthanum, and cerium.

3. The composition according to claim 1, wherein said metal is at least one selected from the group consisting of vanadium, manganese, iron, and zinc.

4. The composition according to claim 2, wherein said metal is added as a metal source in the form of nitrate, chloride, acetate, sulfate or oxide.

5. A method for preparing a metal-incorporated VSB-5 molecular sieve, which comprises the steps of:
   (a) adding at least one metal compound selected from the group consisting of a transition metal, a main-group metal, a noble metal of Group VIII and lanthanide to a mixture comprised of a nickel compound and a phosphorous compound;
   (b) adding an inorganic base or organic base to the resultant of (a); and
   (c) heating and crystallizing the resultant of (b) at a temperature of 50-350° C. and pH 7.0-12.0.

6. The method according to claim 5, wherein said heating is carried out using a microwave or electric heater.

7. The method according to claim 5, wherein during said crystallization, the resultant of (b) is agitated at a rate of 100-1000 rpm.

8. The method according to claim 5, wherein said inorganic base is selected from the group consisting of ammonia, aqueous ammonia, sodium hydroxide, potassium hydroxide, magnesium hydroxide and calcium hydroxide.

9. The method according to claim 5, wherein said organic base is selected from the group consisting of 1,3-diaminopropane, triethyl amine, tri-n-propyl amine, diisopropylethyl amine, triethanol amine, morpholine, cyclohexyl amine and tetraethylethylene diamine.

10. A metal-incorporated VSB-5 molecular sieve, characterized in that said molecular sieve form a framework of VSB-5 molecular sieve and metals are positioned on the inner and outer surfaces of said molecular sieve.

11. The method according to claim 5, wherein the amount of said nickel compound is one mole, the amount of said phosphorus compound is 0.3-3.0 mole, the amount of said metal compound is 0.001-1.0 mole, and the amount of said inorganic base or organic base is 1.0-10.0 mole.

* * * * *